United States Patent [19]

Walters et al.

[11] Patent Number: 4,920,268

[45] Date of Patent: Apr. 24, 1990

[54] PASSIVE INFRARED DETECTION SYSTEM WITH SUBSTANTIALLY UNIFORM SENSITIVITY OVER MULTIPLE DETECTION ZONES

[75] Inventors: Robert E. Walters, Webster; David B. Lederer, Rochester, both of N.Y.

[73] Assignee: Detection Systems, Inc., Fairport, N.Y.

[21] Appl. No.: 304,025

[22] Filed: Jan. 31, 1989

[51] Int. Cl.[5] .................. G01J 5/08

[52] U.S. Cl. .................. 250/353; 250/342

[58] Field of Search .................. 250/353, 342; 340/567

[56] References Cited

U.S. PATENT DOCUMENTS

| | | | |
|---|---|---|---|
| 4,258,255 | 3/1981 | Guscott | 250/221 |
| 4,514,630 | 4/1985 | Takahashi | 250/342 |
| 4,709,152 | 11/1987 | Müller et al. | 250/342 |
| 4,746,906 | 3/1988 | Lederer | 250/347 |

*Primary Examiner*—Janice A. Howell
*Assistant Examiner*—Richard Hanig
*Attorney, Agent, or Firm*—Warren W. Kurz

[57] ABSTRACT

A passive infrared detection system includes a reflective optical system comprising a focusing element (e.g. an elliptical or parabolic reflector) having an apparent focal length dependent upon the displacement of incident rays from the optical axis of such element, and a plurality of planar reflectors arranged at different angles with respect to such optical axis to provide the detection system with a plurality of different zones of detection, each having a different maximum detection range associated with it. According to the invention, the planar reflectors are arranged with respect to the focusing element so that each planar reflector cooperates with a different portion of the focusing element to project onto an IR detector located at the focus of such focusing element a relatively constant size image of a given target located at the maximum detection range associated with that planar reflector. Such an optical system provides the detection system with more uniform sensitivity from one zone of detection to another.

8 Claims, 5 Drawing Sheets

FIG. 1
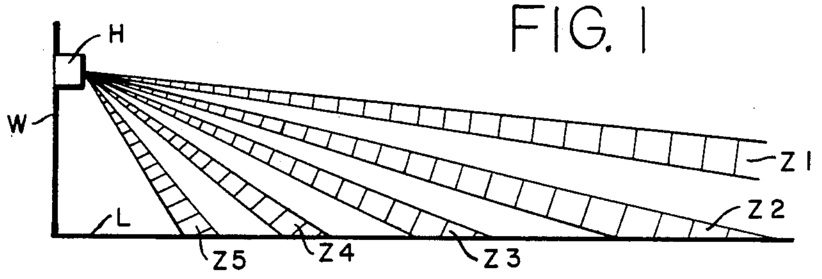
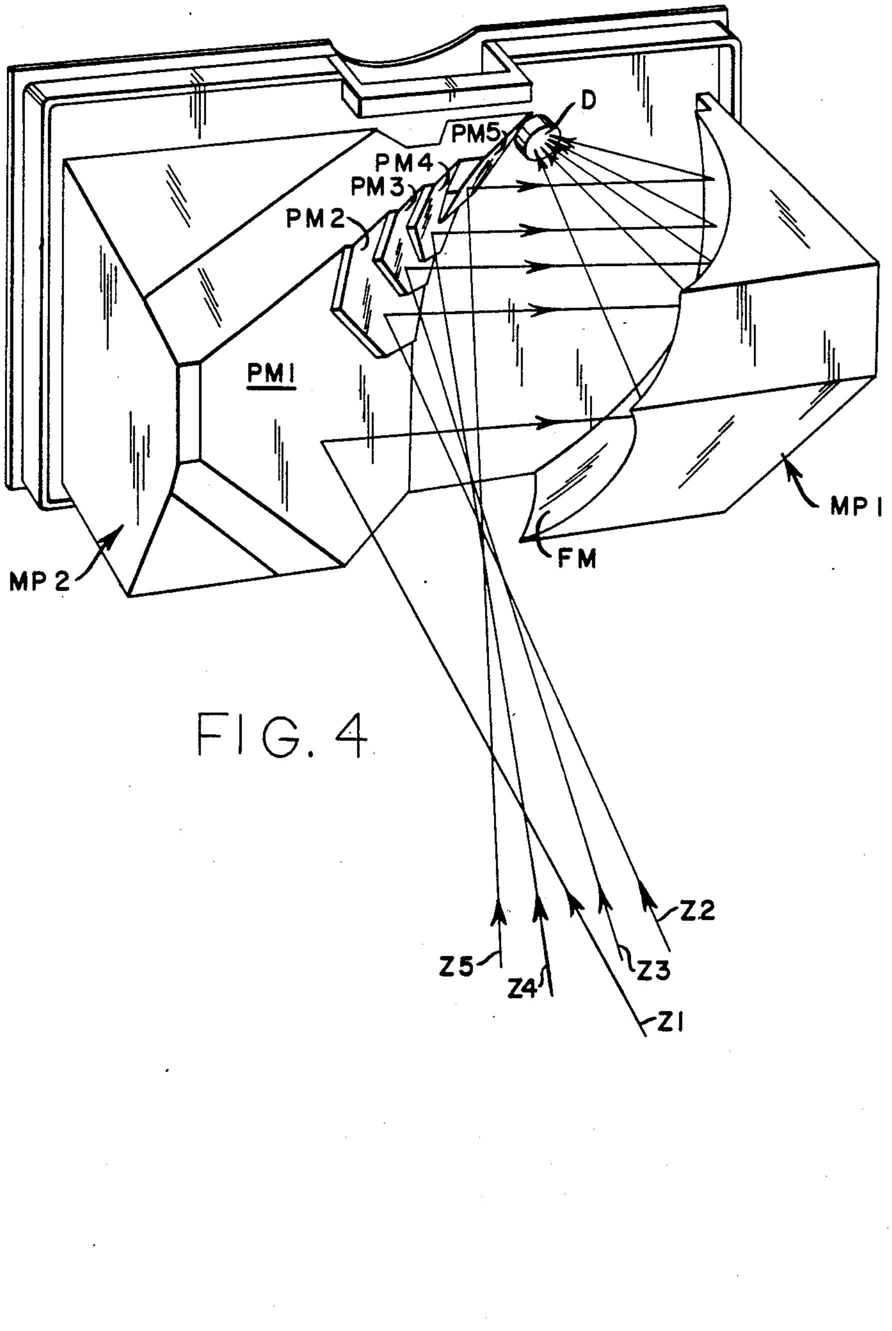
FIG. 4

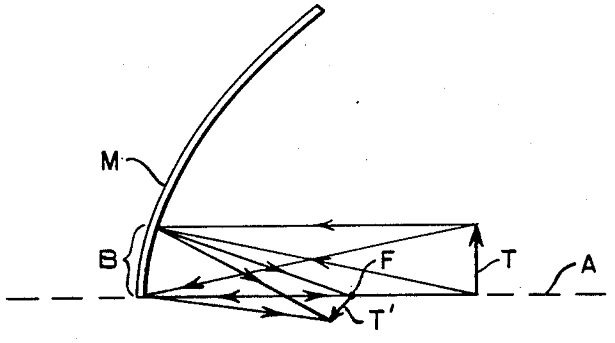
FIG. 2A
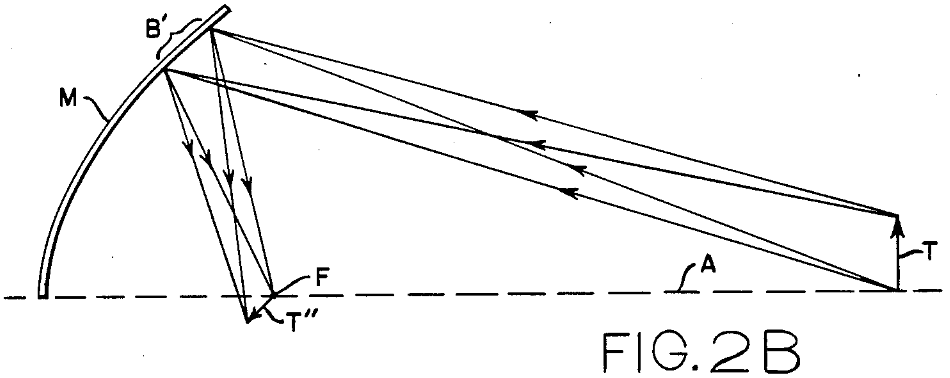
FIG. 2B
FIG. 5
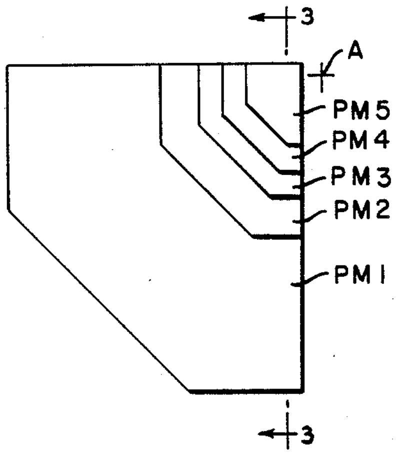

FIG. 7A
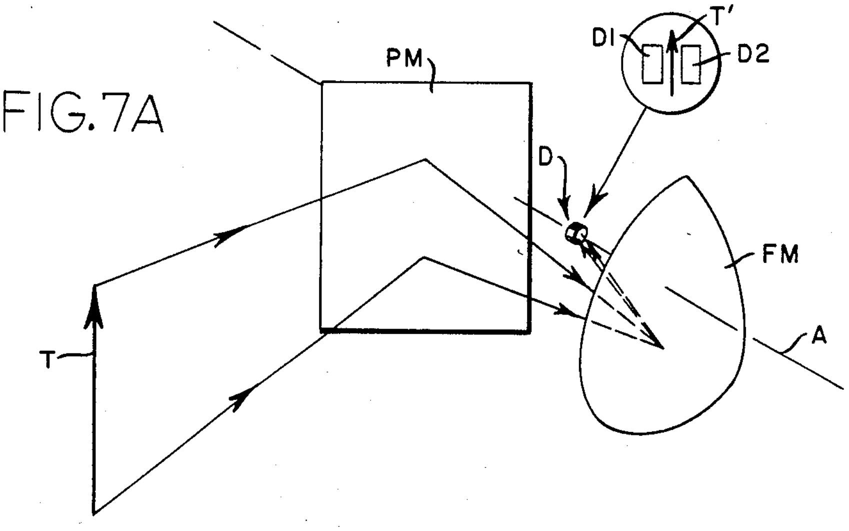
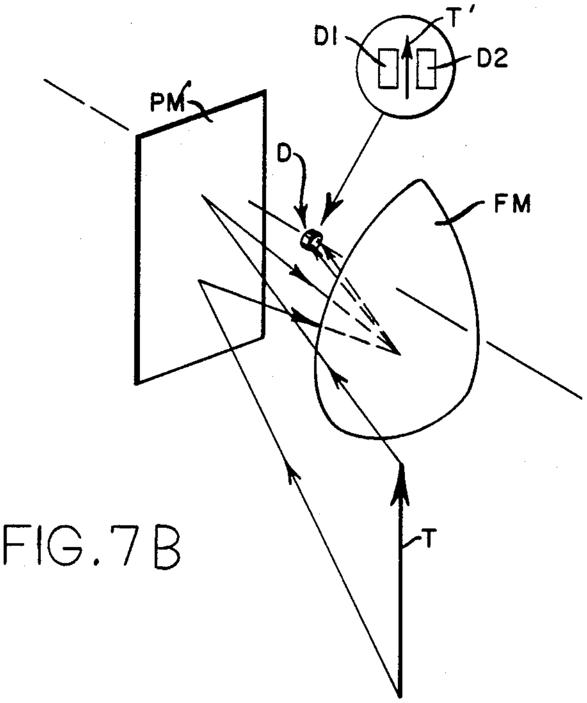
FIG. 7B

PASSIVE INFRARED DETECTION SYSTEM WITH SUBSTANTIALLY UNIFORM SENSITIVITY OVER MULTIPLE DETECTION ZONES

BACKGROUND OF THE INVENTION

The present invention relates to improvements in detection systems of the passive infrared variety. More particularly, it relates to improvements in reflective optical systems of the type used in such detection systems to provide multiple zones of detection.

Heretofore, a variety of detection systems have been proposed and utilized for sensing the presence of an animate object in a region under surveillance. Such systems include conventional intruder detection systems, as well as those systems commonly found in commercial establishments that function, for example, to open doors for approaching pedestrians. Most popular of these systems at the present time are those that sense the presence of such objects from the infrared radiation (i.e., body heat) they give off. Such "passive infrared" detection systems usually comprise an infrared (IR) radiation-sensitive detector capable of producing an output signal in response to slight changes in the level (or rate of change) of IR radiation incident thereon, and a multi-element optical system for focusing the IR radiation emanating in several different detection zones (defined by the optical system) onto the detector. The detector commonly takes the form of a pair of closely spaced pyroelectric sensors which are connected in series opposition to provide common mode rejection of non-target-related signals. The detector output, after suitable signal processing (e.g., to discriminate against false-alarm-producing spurious sources) is used to produce a control signal which, as indicated above, can be used to sound an alarm, open a door, etc.

Referring to FIG. 1, passive IR detection systems are commonly contained in a small housing H which is adapted to be mounted on a wall W several feet (e.g., 5–10 feet) above floor or ground level L. The multi-element optical system used to concentrate IR radiation on the system's detector element often comprises a focusing mirror or parabolic shape (to avoid spherical abberations), and a plurality of planar mirrors which are arranged at different angels relative to the axis of the focusing mirror. This arrangement provides the detector with different fields of view which, in FIG. 1, define the zones of detection Z1–25. An example of such an optical system is disclosed in U.S. Pat. No. 4,258,255. As illustrated in FIG. 1, each detection zone has a specific detection range associated with it, the most distant targets being detectable in zone Z1, and the closest targets, perhaps only a few feet away, being detectable in zone 25.

Optical systems of the above type may be characterized as "single focal length" systems in that all rays incident on the focusing element, i.e., the parabolic mirror, travel about the same distance to the focal point of the parabola. Note, as will be apparent from the ensuing description of the invention, this does not necessarily result from the shape of the parabolic mirror, but rather from the fact that such systems use only a relatively small, axially-located portion of the parabola. Typically, the f/number of optical systems of the above type is approximately unity or greater. As a result of using a single focal length optical system, the size of an image formed on the detector will depend on the target distance from the detector. Referring to FIG. 1, it will be appreciated that a single focal length lens or mirror will produce smaller images of targets located in zone 25 than it will of the same size targets located in zone Z1. Thus, for a given target size moving at a constant rate, target images will vary in size, depending on the displacement between the target and detector. This variation in target image size is undesirable in that it gives rise to system sensitivity variations from zone-to-zone. Moreover, it increases the required amplifier bandwidth for target-related signals, thereby increasing the chance for false alarming.

One solution to the above-noted problems produced by target size variations from zone-to-zone is to use an optical system having several different focusing mirrors, each having a focal length related to the range of protection it, at least in part, defines. In U.S. Pat. No. 4,339,748, there is disclosed a passive IR intruder detection system employing a mirror assembly comprising a plurality of spherical mirror segments arranged in two or more ranks, each rank corresponding to a different operating range. The respective focal lengths of the mirror segments in the same rank are identical, but the focal lengths differ from rank-to-rank, those mirror segments corresponding to a longer operating range having a longer focal length than those segments corresponding to a shorter range. While this multi-focal length optical system results in target images of somewhat uniform size for all zones of protection, it does so at the high cost of using multiple focusing mirrors in a more complex optical assembly.

SUMMARY OF THE INVENTION

In view of the foregoing discussion, an object of this invention to provide an improved optical system for a passive infrared detection system of the type described, an optical system which is improved from the standpoint that it is capable of providing more uniform system sensitivity from zone-to-zone without resorting to multiple focusing mirrors of different focal lengths.

Another object of this invention is to provide a multiple field-of-view, multiple-focal length optical system in which the field pattern can be readily changed by the substitution of one planar mirror array for another.

Like prior art optical systems, the optical system of the invention comprises a focusing element (e.g., a parabolic mirror) of the type having a focal length dependent upon the displacement of incident rays from its optical axis, and a plurality of planar mirrors arranged at different angles with respect to the optical axis of the focusing mirror to provide multiple fields of view or "zones of protection", each having a different range of detection associated with it. Unlike the prior art optical systems, however, the focusing mirror comprising the optical system of the present invention has an unusually low f/number, preferably less than about 0.5, and the planar mirrors are further arranged so that each planar mirror cooperates with a different portion of the focusing element to project a substantially constant image size of a given target onto a detector situated at the focal point of the focusing mirror. According to a preferred embodiment, the focusing mirror has an elliptical shape in which the focii spacing is equal the maximum detection range, and such mirror is positioned so that its optical axis is substantially parallel to ground level. Also preferred is that the radiation-collecting area of each of the planar mirrors is directly proportional to the detection range associated with it.

The invention and its various advantages will become more apparent to those skilled in the art from the ensuing detailed description of a preferred embodiment, reference being made to the accompanying drawings.

BRIEF DESCRIPTION OF THE DRAWINGS

FIG. 1 is a side elevation of the zones of detection provided by a passive IR detection system of the type in which the optical system of the present invention has particular utility;

FIGS. 2A and 2B are ray traces schematically illustrating the inventive concept;

FIG. 4 is a perspective view of a preferred embodiment of the invention;

FIG. 5 is a top plan view of the planar mirror assembly of the FIG. 4 optical system; and FIGS. 6A, 6B, 7A and 7B are optical schematic drawings illustrating a preferred orientation of the focusing element of the FIG. 4 optical system.

DETAILED DESCRIPTION OF PREFERRED EMBODIMENTS

Referring again to the drawings, FIGS. 2A and 2B are optical diagrams illustrating the basic concept of the invention. As shown in FIG. 2A, a target T of a given size is located relatively close to a focusing mirror FM, close to the mirror's optical axis A. As will soon become apparent, the shape of the focusing mirror is key to attaining the advantageous features of the invention. More specifically, it is essential that the focusing mirror be of the type in which the radius of curvature varies (e.g., increases) with displacement from the optical axis A. Parabolic and elliptical mirrors, of course, exhibit this property. The focusing mirror serves to form an image T' at the mirror's focal point FP. Notice, in the illustration, that only those rays which are relatively close to the optical axis, i.e., those rays incident on area B of the mirror, serve to form image T'.

In FIG. 2B, an identical target is located relatively far away from mirror FM, close to the optical axis. Incoming rays from the target strike area B' on the focusing mirror and are brought to focus at the mirror's focal point to form an image T''. Owing to the larger radius of curvature of mirror area B' relative to area B, the imaging rays travel a greater distance to the image plane after being incident on area B', the result being that the target images T' and T'' are substantially the same size, notwithstanding the difference in target distance in the two drawings. It will be appreciated that the uniformity in target image size results from using a focusing element whose focal length varies with the displacement of incident rays from the optical axis. While parabolic and elliptical mirrors exhibit this quality, spherical mirrors do not since the focal length is the same everywhere on the surface of a spherical mirror.

Figure 3:
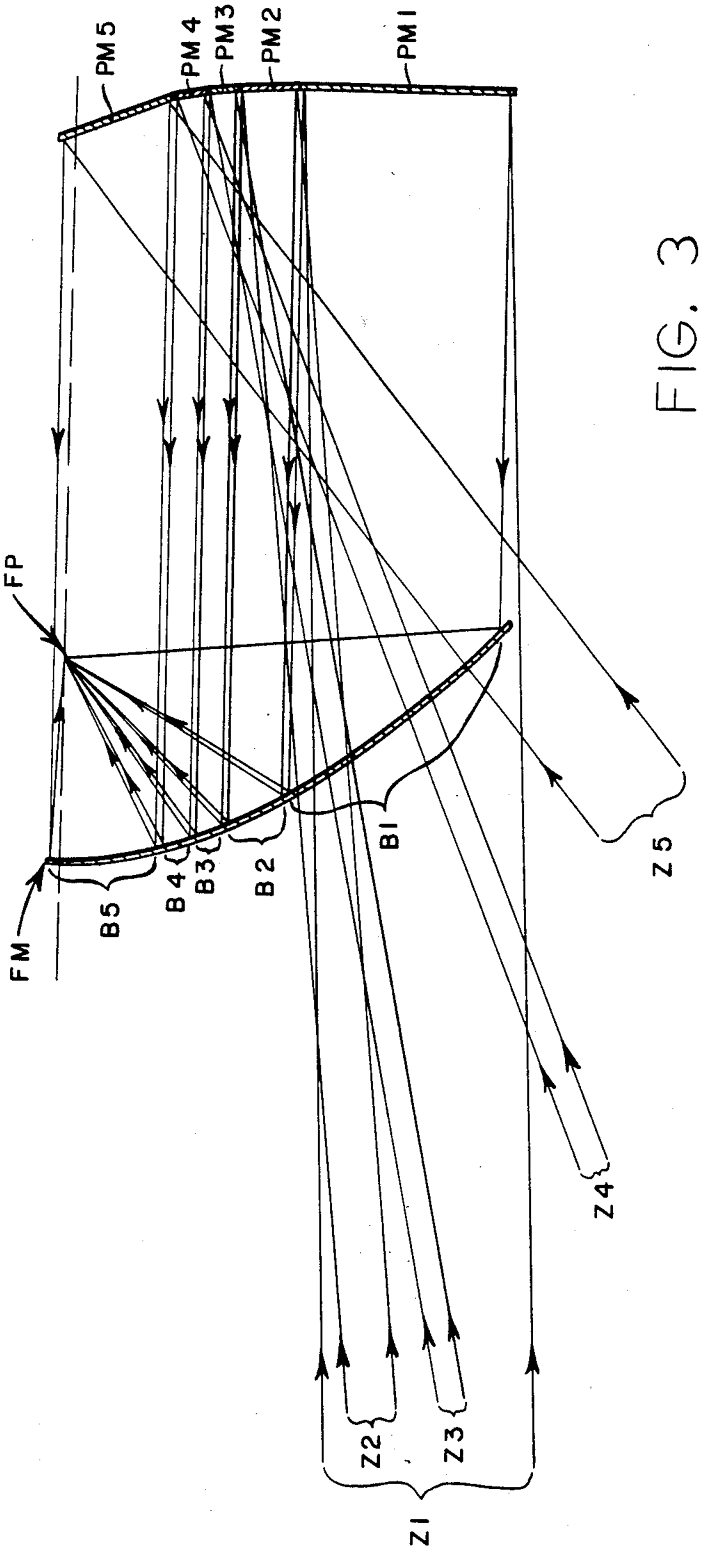
FIG. 3 is an optical schematic further illustrating the concept of the invention.

In FIG. 3, the focusing mirror of FIGS. 2A and 2B is shown cooperating with a plurality of planar mirrors PM1–PM5 to reflect radiation emanating in a like plurality of detection zones Z1–Z5 onto a detector D situated at the mirror's focal point. Here again, rays from the far-field zone Z1, after striking planar mirror PM1, are incident upon that portion of the focusing mirror having the largest radius of curvature and, hence, the greatest magnification, namely, portion B1. In a like manner, rays from the near-field zone Z5 strike planar mirror PM5 which is arranged to re-direct such rays to that portion of the focusing mirror having the shortest radius of curvature and, hence, the least magnification, namely, portion B5. Of course, the rays emanating in the intermediate zones Z2–Z4 are incident upon the planar mirrors PM2–PM4, respectively, and these planar mirrors re-direct such rays to focusing mirror portions B2–B4, respectively, which, in turn, bring such rays to focus at focal point FP. The result of this arrangement of planar mirrors and the different portions of the focusing mirror with which they cooperate is that a given target at the maximum range in any of the detection zones will be imaged to approximately the same size on the detector. By this arrangement, the aforementioned problems associated with different size target images are substantially reduced.

In FIG. 4, the concept of the invention is shown embodied in an optical system having two molded parts MP1 and MP2. The molded parts are made of plastic and those surfaces intended to serve as the aforementioned planar mirrors PM1–PM5 and focusing mirror FM are made radiation-reflecting by a metallized coating. While it should be apparent from the above discussion that the benefits of the invention will be achieved by a focusing mirror of parabolic shape, they may also be achieved with a focusing mirror having an elliptical contour. According to a preferred embodiment, the focusing mirror of FIG. 4 defines a quarter-sector of an ellipse whose optical axis A preferably extends horizontally, that is, parallel to the ground. Ideally, the shape of the ellipse is such that one of its focii is at the maximum intended detection range, the other focii, of course, being where the radiation detector D is located. Note, in the case of a parabolic reflector, the "second" focii is at infinity. Since intruder detection systems of the passive IR type can not operate much beyond 100 feet (owing to detector sensitivity), there is no need to focus objects from infinity and, accordingly, parabolic reflectors are not essential. To achieve the best results, that is, to attain uniform target image size over a broad detection range, it is highly preferred that the focusing mirror have a relatively large entrance aperture so as to provide a focal length variation, as determined for marginal rays and paraxial rays, of at least 2:1. In fact, the larger the aperture, the better results, until such considerations as blur and comma produce unacceptable spill-over of the image on the detector. The aperture, of course, is somewhat limited by the application, bearing in mind, for example, that intruder detection are supposed to be non-obtrusive. According to a particularly preferred embodiment, the focusing mirror has a diameter of about 20 centimeters, with a focal length, as determined by paraxial rays, of about 2.5 centimeters; notice, however, in the FIG. 4 embodiment, that only one quadrant of the mirror is used in order to maintain the physical size of the system within acceptable limits.

As regards the planar mirror module defined by molded part MP2, each of the planar mirrors PM1–PM5 is tilted relative to axis A at a different angle, and each is further rotated, at a different angle, about a horizontal axis in the plane of the mirror. In this manner, the different zones of detection Z1–Z5 are provided. Since the optical system is composed of two discrete modules, the pattern of detection can be readily altered by simply substituting one planar mirror module for another. Such a modular optical system in which the detection pattern is changed by simply changing the planar mirror module is disclosed in the commonly assigned U.S. Pat. No. 4,689,486. Preferably, the surface area of each of the planar mirrors is proportional to the detection range associated with it. Thus, the the most distant zone Z1 makes use of the largest planar mirror PM1, and the closest zone 25 makes use of the smallest planar mirror PM5. By this arrangement, the detection system sensitivity is more uniform from zone-to-zone. The relative sizes of the planar mirror elements is shown in the plan view of FIG. 5. Note, in FIG. 3, planar mirror PM5 appears larger than PM4. This is only because of the cross-sectional cut taken along the section line 3—3 in FIG. 5. In FIG. 5, it may be appreciated that the light-collecting areas of the planar mirrors gradually decrease from PM1 to PM5.

Figure 6A:
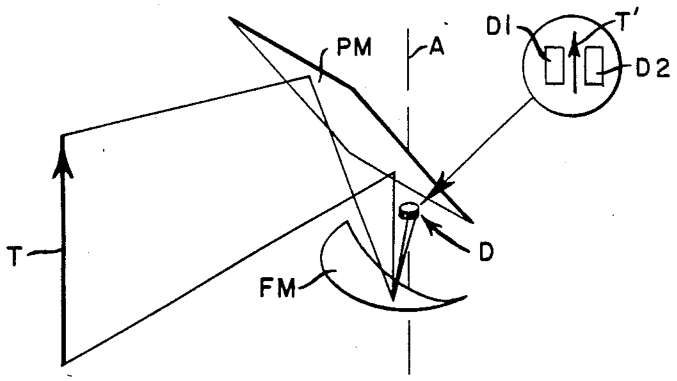
Figure 6B:
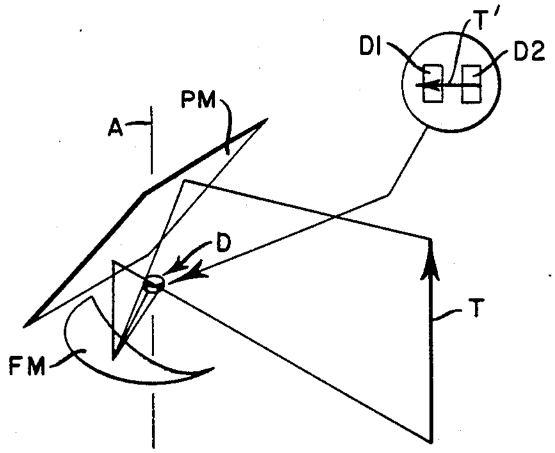

As indicated above, it is highly preferred for most applications that the focusing mirror be arranged so that its axis is horizontally disposed. Referring to FIGS. 6A and 6B, it will be seen that, were axis A vertically oriented, movement of a target T in a horizontal plane from the position shown in FIG. 6A to the position shown in FIG. 6B would cause the target image to rotate by 90 degrees. In the case where the detector comprises a pair of spaced detector elements PD1 and PD2, the target will become increasingly more difficult to detect as the target approaches the FIG. 6B position. This assumes a conventional differential detection scheme. In contrast, the focusing mirror of FIGS. 7A and 7B is arranged so that its axis is horizonally disposed. Here, as the target moves through the same angular range in a horizontal plane, there is no rotation of the target image, thereby making targets as easy to detect in one position as the other.

While the invention has been described with particular reference to a preferred embodiment, it will be apparent that modifications can be made without departing from the spirit of the invention, and such modifications are intended to be embraced by the accompanying claims.

We claim:

1. A passive infrared detection system comprises an infrared radiation-sensitive detector and a reflective optical system for focusing infrared radiation emanating from a plurality of detection zones onto said detector, said reflective optical system comprising a focusing element having an apparent focal length dependent upon the displacement of incident rays from the optical axis of said element, and a plurality of planar reflectors arranged at different angles with respect to such optical axis to provide the detection system with said plurality of detection zones, each zone having a different maximum detection range associated with it, said planar reflectors being arranged with respect to said focusing element so that each planar reflector cooperates with a different portion of the focusing element to project onto said detector a relatively constant size image of a given target located at the maximum range associated with that planar reflector.

2. The apparatus as defined by claim 1 wherein said focusing element has a parabolic contour.

3. The apparatus as defined by claim 1 wherein said focusing element has an elliptical contour.

4. The apparatus as defined by claim 3 wherein the respective focii of said elliptical contour are spaced apart by a distance about equal to the maximum range of detection of said detection system.

5. The apparatus as defined by claim 1 wherein the optical axis of said focusing element is approximately horizontally disposed.

6. The apparatus as defined by claim 1 wherein the focusing element comprises a quadrant of an elliptical mirror of circular aperture.

7. The apparatus as defined by claim 1 wherein the focusing element comprises a quadrant of a parabolic mirror of circular aperture.

8. The apparatus as defined by claim 1 wherein the focal length of said focusing element varies by at least 2:1 over its radiation-collecting surface, as determined by incident marginal and paraxial rays.

* * * * *